United States Patent [19]

Mannen

[11] Patent Number: 4,765,387

[45] Date of Patent: Aug. 23, 1988

[54] TIRE CHANGER SAFETY FOOT

[75] Inventor: Bryce L. Mannen, Conway, Ark.

[73] Assignee: FMC Corporation, Chicago, Ill.

[21] Appl. No.: 10,030

[22] Filed: Feb. 2, 1987

[51] Int. Cl.[4] .......................................... B60C 25/00
[52] U.S. Cl. ................................. 157/1.0; 157/1.24; 157/1.1; 157/14
[58] Field of Search ................. 157/1, 1.1, 1.17, 1.22, 157/1.24, 1.26, 1.28, 14–21; 141/38, 97; 206/304; 152/415

[56] References Cited

U.S. PATENT DOCUMENTS

| | | | |
|---|---|---|---|
| 3,552,469 | 1/1971 | Corless | 157/1.1 |
| 3,675,705 | 7/1972 | Corless | 157/1.1 |
| 3,677,320 | 7/1972 | Corless | 157/1.1 |
| 3,700,021 | 10/1972 | Motis | 157/1.1 |
| 3,785,424 | 1/1974 | Rishovd | 157/1.1 |
| 3,805,871 | 4/1974 | Corless | 157/1.1 |
| 3,911,989 | 10/1975 | Vandenburg | 157/1.24 |
| 3,937,264 | 2/1976 | Mikovits et al. | 157/1.1 |
| 4,263,958 | 4/1981 | Corless | 157/1.1 |
| 4,335,772 | 6/1982 | Bubick et al. | 157/1.28 |
| 4,529,024 | 7/1985 | Vijay | 157/1.24 |

FOREIGN PATENT DOCUMENTS 1524514 9/1978 United Kingdom .............. 157/1

OTHER PUBLICATIONS

Two page brochure CP/Coats Air-Flate Rim Clamp Tire Changer RC-10A.

*Primary Examiner*—Debra Meislin
*Attorney, Agent, or Firm*—H. M. Stanley; R. B. Megley

[57] ABSTRACT

Safety apparatus for tire inflation operations on a tire changing machine having a tire inflation system. The machine has a support table for receiving a tire/rim assembly, and has a tower at one side of the machine which supports a tire mount-demount head on a vertical adjust arm in position over the support table. A foot is provided for mounting on the mount-demount head, in one embodiment, so that the foot may be placed above a tire/rim assembly being inflated to absorb explosive forces if the tire explodes from the rim due to over inflation or a faulty tire bead. In another embodiment the mount-demount head has an impact absorbing member adjustable in vertical position on the vertical adjust arm. The impact absorbing member extends therefrom to overlie a tire/rim assembly for the aforementioned purpose.

8 Claims, 2 Drawing Sheets

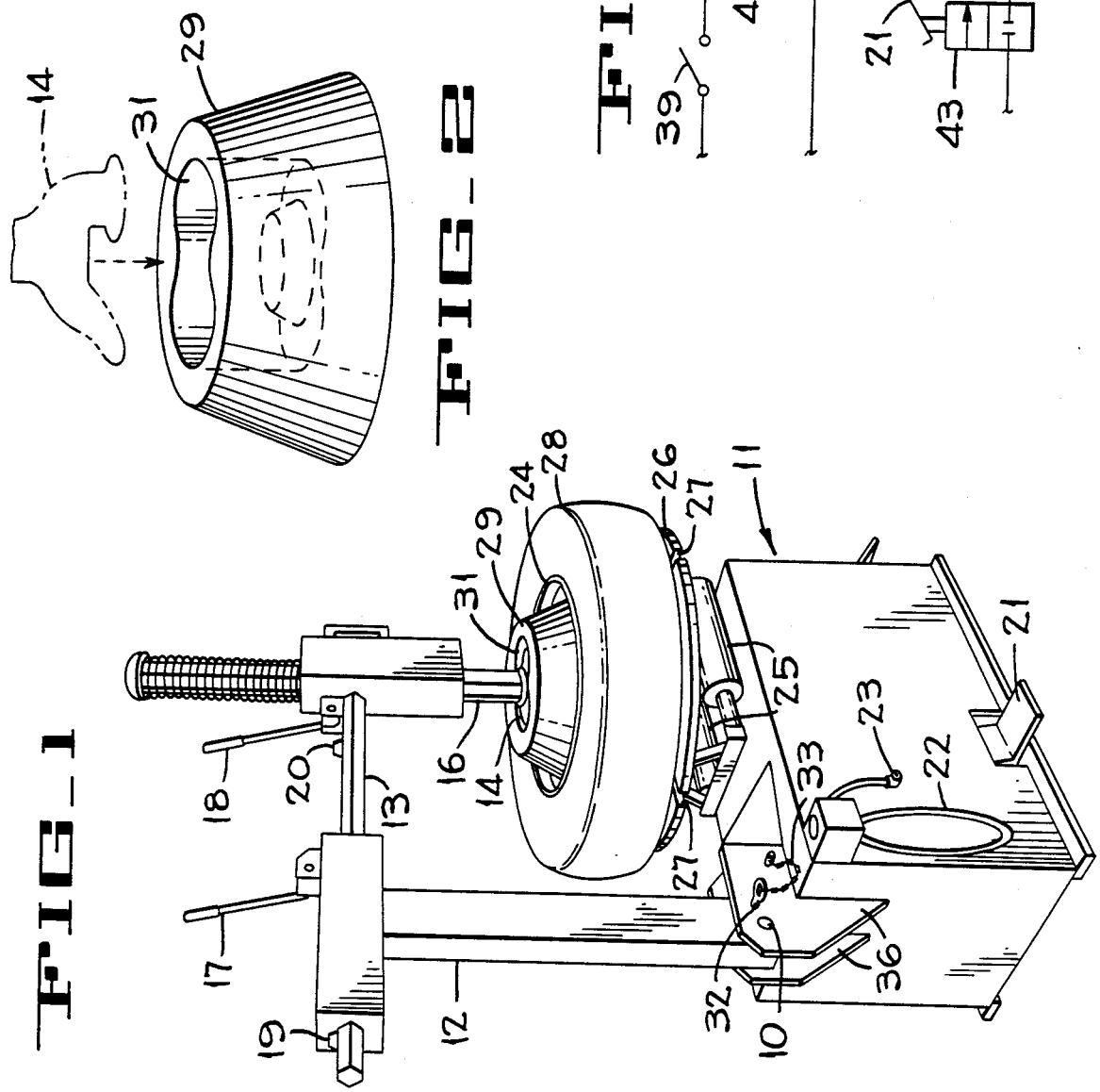
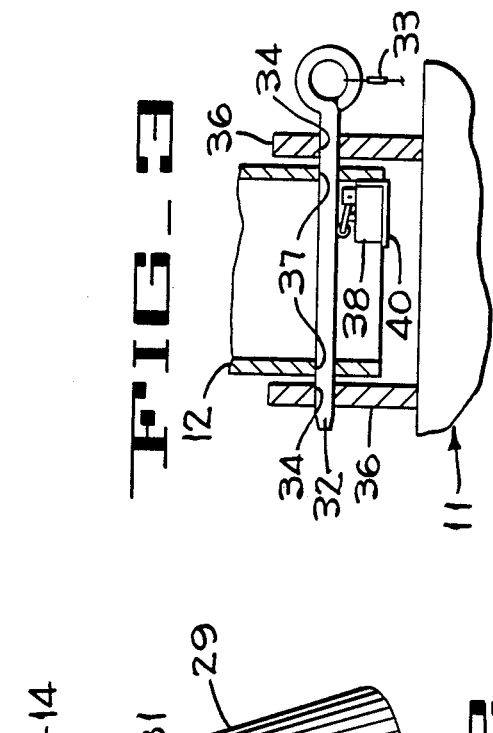
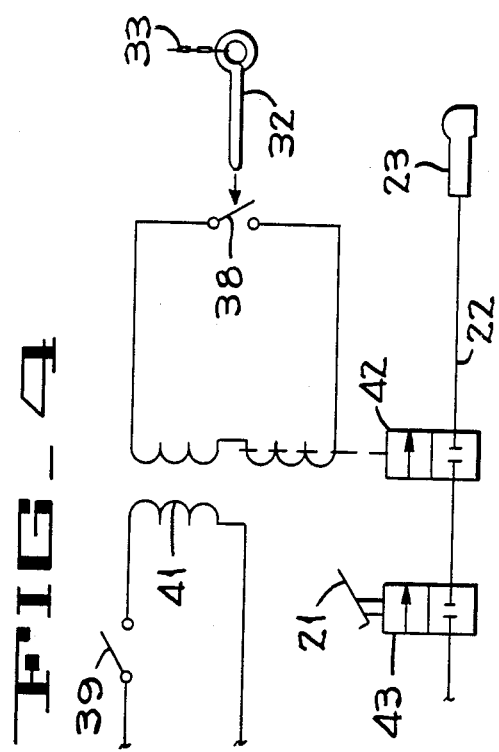

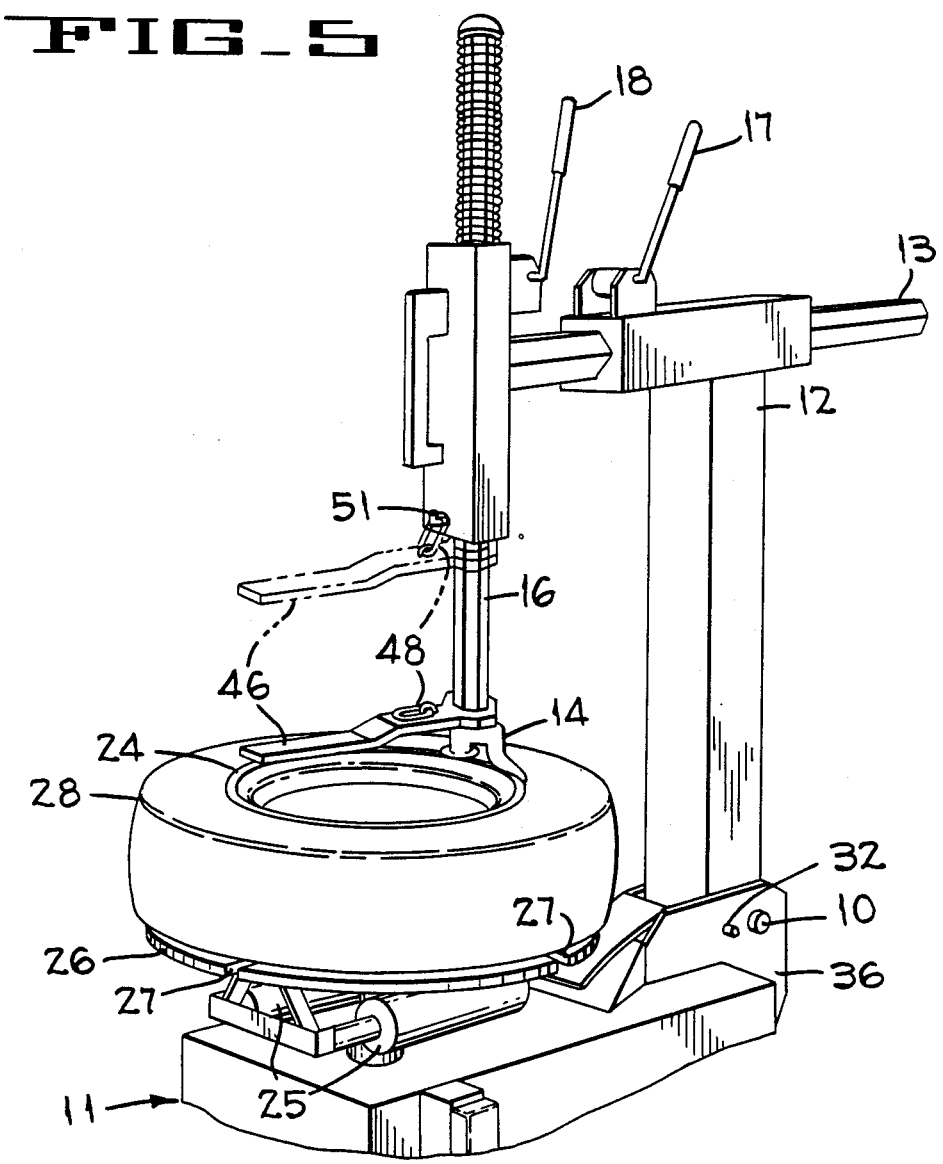
FIG_5
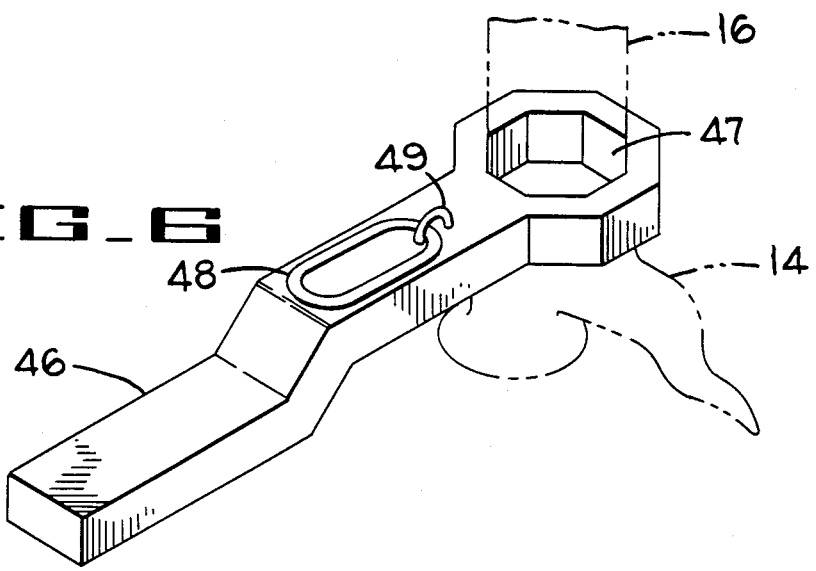
FIG_6

TIRE CHANGER SAFETY FOOT

SUMMARY OF THE INVENTION

A safety apparatus is provided for mounting on a tire changing machine having a tire inflating system, a table for receiving a rim/tire assembly to be inflated thereon, and a tower at one side of the machine supporting a tire mount/demount head which is adjustable in height and lateral position on the machine. An impact member is included which is adapted to be attached to the mount/demount head and to be disposed to overlie the surface of a rim on the rim/tire assembly receiving table.

A tire changing machine has a supporting framework, a rim/tire assembly receiving table mounted on the upper portion of the framework, a tire inflation system supported by the framework and the table, and a tower extending upwardly from one side of the framework, the tower having mounted thereon a mount/demount head which is adjustable in vertical and horizontal position. The improvement in the tire changing machine comprises an impact absorbing member coupled to the mount/demount head, the impact absorbing member being disposable in a retention position immediately overlying the center of the table and in a position remote therefrom.

BRIEF DESCRIPTION OF THE DRAWINGS

FIG. 1 is a perspective view of a tire changer utilizing the present invention.

FIG. 2 is a perspective view of the safety foot depicted in FIG. 1.

FIG. 3 is a partial sectional view through the base of the tower on the tire changer.

FIG. 4 is an electrical-pneumatic schematic of a portion of the tire changer in FIG. 1.

FIG. 5 is a partial perspective view of a tire changer utilizing an alternative embodiment of the present invention.

FIG. 6 is a perspective view of the impact member of the embodiment of FIG. 5.

DESCRIPTION OF THE PREFERRED EMBODIMENTS

The invention disclosed herein will be described primarily in conjunction with a rotating table type tire changer for mounting and demounting tires onto and from vehicle wheel rims. The apparatus and method described herein is also useful on a tire changer having a stationary table for receiving the rim of a vehicle wheel. A tire changer of the first mentioned type is shown in FIG. 1 having a base shown generally at 11 with a tower 12 mounted at one end of the base. The tower is disposed to rock about a tower pivot 10 into a position away from the base 11 to remove the mechanism supported by the tower from a position overlying the base. The tower is also able to be positioned as shown in FIG. 1 where it assumes a substantially vertical position. An arm 13 is disposed to slide generally horizontally through an upper portion of the tower 12 to dispose a tire mount-demount head 14 (FIG. 2) in a position overlying the junction of a vehicle wheel rim and tire bead when the tower 12 is in the substantially vertical position. A vertical adjust arm 16 is adjustable to place the mount-demount head in proper position relative to the tire bead and the wheel rim to mount or demount the tire therefrom as desired. The horizontal and vertical adjust arms 13 and 16 are capable of being locked in position by means of manual locking mechanisms actuated by locking handles 17 and 18. Actuation of the locking handles spaces the mount-demount head 14 appropriately from the vehicle rim to avoid damage to the rim during operation as is well known in this art.

The horizontal adjust arm 13 is longer than usual in the embodiment of FIG. 1, so that the vertical adjust arm may be extended farther from the tower 12 for a purpose to be hereinafter described. Rubber stops 19 and 20 are positioned on the horizontal adjust arm for the purpose of limiting the extension and retraction, respectively, of the horizontal adjust arm relative to the tower.

A foot pedal 21 is shown extending from the base 11 for actuation by an operator to provide pressurized air to a tire inflation system included in the tire changing machine. The inflation system includes a tire inflation hose 22 having an air chuck 23 at the end thereof which is adapted to couple to air inflation valves on tires. The air inflation system may also include a bead seater ring (not shown) attached to a rotating table 26 on the tire changer, where the bead seater may be similar to that disclosed in U.S. Pat. No. 3,805,871. The table is rotated by means of an electrical motor and interconnecting gearing (not shown) which is known in this art and is supported within the base 11. The table in this type of tire changer has a number (in most cases 4) of moving jaws (also not shown) which are disposed to move radially in grooves 27 shown intercepting the edge of the table 26 to thereby clamp either the inside or the outside of a tire rim 24. The jaws on the tire changer are caused to move radially by actuation of two pneumatic cylinders 25 positioned beneath the table 26 and above the base 11 which, through a system of simple levers, cause the jaws to undergo their aforedescribed radial movement. In this known manner, a tire 28 and rim 24 assembly is firmly positioned on top of the table 26. However, in a tire changer where the wheel and rim assembly is captured to prevent radial motion on the tire changer table, motion of the tire and wheel assembly, or parts thereof, axially away from the table is not restrained to any appreciable degree. Moreover, it is common to relax the grip exerted on the rim by the jaws during the process of inflating the tire on the rim while it rests on the support table 26. Therefore, if a tire mounted on the table is overinflated to the point of explosion, the tire rim assembly will move violently upward off of the table 26 endangering any persons situated in the near vicinity.

The manner in which the violent movement of an exploding tire and rim assembly may be arrested on a tire changer involves, in one embodiment disclosed herein, extending the horizontal adjust arm 13 outwardly from the tower 12 until the axis of the vertical adjust arm 16 substantially overlies the rotational axis of the support table 26. An impact member 29, best seen in FIG. 2, has a cavity 31 formed in the upper surface thereof. The cavity is configured to accept the mount-demount head 14 at the lower end of the vertical adjust arm 16. It may therefore be seen that the tire/rim assembly 28/24 may be placed on the support table 26 for inflation and the vertical adjust arm 16 moved upward to a position clearing the tire/rim assembly. The impact member 29 is positioned so that it accepts the mount-demount head 14 within the cavity 31. The vertical adjust arm 16 may thereafter be lowered to thereby lower the impact member into contact with the upper surface of the rim 24. The vertical adjust arm is then locked in place with the handle 18.

Since the tower 12 of the tire changer of FIG. 1 is configured to rock about pivot 10 rearwardly away from the base 11 as hereinbefore described, the force of an exploding tire/rim assembly situated on support table 26 could pivot the tower 12 rearwardly allowing the exploding tire/rim assembly to acquire some momentum before being completely arrested by the impact member. To prevent this, a lock pin 32 which is secured to the base 11 by means of a chain 33, is inserted through two aligned holes 34 in flanges 36 which extend upwardly from the base 11. The flanges serve primarily to support the pivot at the base of the tower 12 so that the tower may either be pivoted into the substantially vertical operating position seen in FIG. 1 or the inclined storage position rocked rearwardly away from the base 11. An aligned pair of holes 37 are also formed in the base of the tower 12. The holes 37 are positioned to align with the holes 34 when the tower 12 is in the vertical operating position. Therefore, in the position depicted in FIG. 1 of the drawings the lock pin 32 may be inserted through all four holes to thereby prevent the tower 12 from being rocked rearwardly into the storage position. Consequently, the impact member 29 will be retained in contact with the rim during any explosion of a tire/rim assembly on the support table 26 and will absorb the forces of the explosion prior to allowing any substantial movement or momentum buildup in the tire/rim assembly.

Insertion of the lock pin 32 through the aligned holes 34 and 37 accomplishes a further objective. An electrical switch such as a microswitch having a roller-tipped switch actuating lever is shown at 38. The microswitch is mounted on a bracket 40 within the lower end of the tower 12 and is adjustable in position so that insertion of the lock pin 32 will cause the normally open switch contacts to close. The manner in which this is useful is shown in FIG. 4. An on-off electrical switch 39 for the tire changer provides power through a transformer 41 to a circuit including the microswitch 38 (normally open) and a solenoid actuated pneumatic valve 42. The solenoid actuated valve is an enabling valve placed in the tire inflation air path defined by the tire inflation hose 22. The foot pedal 21 mentioned hereinbefore manually actuates a valve 43 also in the tire inflation air path. However, actuation of the foot pedal 21 alone will not provide tire inflation air through the hose 22 to the air chuck 23. Thus, it may be seen that locking pin 32 must be inserted through the holes 34 and 37 to thereby actuate the microswitch 38 and the solenoid actuated pneumatic valve 42 to enable the tire inflation air path. Thereafter, tire inflation air may be delivered to the air chuck 23 by actuation of the foot pedal whereupon it is available at a tire inflation valve. Therefore, if it is deemed necessary to lock the tower in the vertical position to provide adequate safety, tire inflation cannot proceed until tower locking is accomplished.

An alternative embodiment of the disclosed invention is shown in FIG. 5 where similar structure has been assigned the same item numbers as in FIG. 1. It will be noted that the lock pin 32 may be utilized in the embodiment of FIG. 5 also. It is not necessary for the horizontal adjust arm 13 to have as great a degree of extension as described hereinbefore for the embodiment of FIG. 1. The mount-demount head 14 is required, in this embodiment, to extend only to a position where it is normally required to be to mount and demount a tire 28 onto and off of a rim 24. A laterally extending rigid arm 46 is shown supported at one end by that portion of the vertical adjust arm 16 extending below the enclosure for the vertical adjust arm in FIG. 5. The one end of the rigid arm 46 has an opening 47 formed therethrough which is configured in the same shape as the periphery of the vertical adjust arm 16. In this instance, the vertical adjust arm has a hexagonal periphery and the opening 47 has a hexagonal shape. The rigid arm 46 is positioned on the vertical adjust arm to extend in a diametrical direction relative to a wheel rim on table 26 as shown in FIG. 5. The rigid arm therefore assumes a position overlying support table 26 and any tire/rim assembly 28/24 supported thereon. It is probable that the length of the arm 46 should be such as to extend all the way across the diameter of the rim, although shorter lengths would likely provide the safety feature sought.

The rigid arm 46 is diposed for axial movement along the vertical adjust arm 16 and may assume a safety position overlying the rim 24 or a remote out-of-the-way position shown in phantom lines in FIG. 5. As seen in FIG. 6, a ring 48 is attached to the top of the rigid arm 46 by an eye 49. The rigid arm is held in the remote or stowed position of FIG. 5 by placing the ring over a hook 51 (FIG. 5) fixed on the housing for the vertical adjust arm.

It may be seen that the impact of an exploding tire/rim assembly being inflated while on the support table 26 is absorbed by the impact member formed by the rigid arm 46 when it is released from its storage position and positioned as seen in solid lines in FIG. 5. Force from an exploding tire will not move the arm 46 upward on the vertical adjust arm 16, because the arm 46 will tend to rotate about a diameter across the opening 47 due to the moment created in by the explosive force. The moment will cause high friction levels between the rigid and vertical adjust arms at the opening 47 and little or no movement will take place. The use of the locking pin 32 as described in the embodiment of FIG. 1 will further stabilize the rigid arm in position to absorb impact from tire explosion.

Although the best mode contemplated for carrying out the present invention has been herein shown and described, it will be apparent that modification and variation may be made without department from what may be regarded to be the subject matter of the invention.

What is claimed is:

1. Safety apparatus mounted on a tire changing machine having a tire inflating system, a table for receiving a rim/tire assembly to be inflated thereon, and having a tower at one side of the machine supporting a tire mount/demount head which is adjustable in height and lateral position to enable said head to be moved from a tire mount/demount position to a position in engagement with said safety apparatus during tire inflation, said safety apparatus comprising
   an impact member having means to receive the mount/demount head and disposed to overlie the surface of a rim on the rim/tire assembly receiving table in a safety position during tire inflation, and said impact member being removable to a remote out-of-the-way position during tire mount/demount operations.

2. Safety apparatus as in claim 1 comprising means for extending the lateral position adjustment of the mount/demount head, and wherein said impact member comprises a foot for positioning substantially over the centerline of the rim/tire assembly, said foot having a cavity forming said receiving means in the upper side thereof which is adapted to receive the mount/demount head.

3. Safety apparatus as in claim 1 wherein the tower is pivotable between an upright operating position and an out-of-the-way position, comprising releasable lock means movable between an engaged position and a released position for retaining the tower in the upright operating position when said lock means is in the engaged position.

4. Safety apparatus as in claim 3 wherein the inflation system includes a tire inflating air path, comprising an enabling valve actuated by said lock means in said engaged position to thereby enable the tire inflating air path.

5. In a tire changing machine having a supporting framework, a rim/tire assembly receiving table mounted on the upper portion of the framework, a tire inflation system supported by the framework and the table, and a tower extending upwardly from one side of the framework, the tower having mounted thereon a mount/demount head which is adjustable in vertical and horizontal positions to enable said head to be moved from a tire mount/demount position to a position in engagement with a safety apparatus during tire inflation, said safety apparatus comprising an impact absorbing member having means to receive the mount/demount head, said impact absorbing member being disposable in a retention position immediately overlying the center of the table during tire inflation and said impact member being removable to a remote out-of-the-way position during tire mount/demount operations.

6. A tire changing machine as in claim 5 comprising means for extending the horizontal position adjustment of the mount/demount head, and wherein said impact absorbing member comprises a foot for positioning substantially over the centerline of the rim/tire assembly, said foot having a cavity forming said receiving means in the upper side thereof which is adapted to receive the mount/demount head.

7. A tire changing machine as in claim 5 wherein the tower is pivotable from an upright operating position into an out-of-the-way position, further comprising releasable lock means movable between an engaged position and a released position for retaining the tower in the upright operating position when said lock means is in the engaged position.

8. A tire changing machine as in claim 7 wherein said inflation system includes a tire inflating air path, comprising an enabling valve actuated by said lock means in said engaged position to thereby enable the tire inflating air path.

* * * * *